(No Model.)
E. E. STOW.
TEA POT HANDLE.
No. 358,580. Patented Mar. 1, 1887.
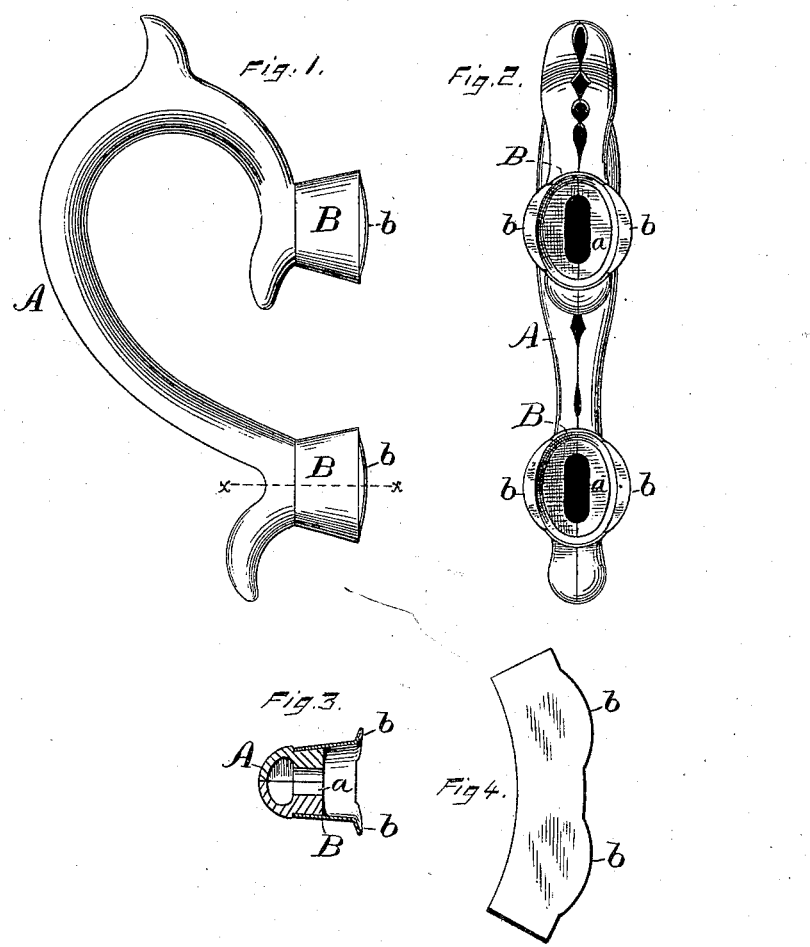
Witnesses.
John Edwards Jr.
W. H. Whiting.
Inventor.
Enos E. Stow
By James Shepard
Atty.

UNITED STATES PATENT OFFICE.

ENOS E. STOW, OF PLANTSVILLE, CONNECTICUT, ASSIGNOR TO THE PECK, STOW & WILCOX COMPANY, OF SAME PLACE.

TEA-POT HANDLE.

SPECIFICATION forming part of Letters Patent No. 358,580, dated March 1, 1887.

Application filed February 15, 1886. Serial No. 191,921. (No model.)

*To all whom it may concern:*

Be it known that I, ENOS E. STOW, a citizen of the United States, residing at Plantsville, in the county of Hartford and State of Connecticut, have invented certain new and useful Improvements in Tea-Pot Handles, of which the following is a specification.

My invention is for improvements in that class of handles which have sheet-metal shanks or connections for connecting the handle to the tea-pot by solder.

The objects of my invention are to faciltate the fitting and soldering of these connections to the vessel, to enable the handle to be secured over a seam, and to make a stronger union of the handle to the vessel.

In the accompanying drawings, Figure 1 is a side elevation of my tea-pot handle. Fig. 2 is an edge view of said handle. Fig. 3 is a sectional view thereof on line $x\,x$ of Fig. 1, and Fig. 4 is a plan view of the blank for forming the sheet-metal connection of said handle.

The body or main portion of the handle A is made of cast metal, while the connections B are of tin or sheet metal, to which solder will readily adhere. The particular handle shown is the one patented to me December 10, 1867, No. 71,920. The shanks $a\,a$ of the handle are made slightly tapering and largest at the end which is farthest from the body of the handle, so that when the blank, Fig. 4, is bent around said shanks into a tubular form of a corresponding taper, with its ends lapped and soldered, it forms what I term the "connections," B B, and is held thereon by reason of its form; but in order to more firmly secure said connections they have been soldered to the shanks $a\,a$. In some instances the connections have been of a cup shape, instead of tubular; but the edge designed to be soldered to the pot was of the same form in both instances, and my invention is applicable to either the cup-shaped or tubular form of connections.

Heretofore the edge of the connections B B, which is designed to rest against and be soldered to the body of the vessel, (which edge I will, for convenience, term the "outer" edge,) has been left straight, so that the connections were substantially square across, or in one plane at their outer edge or end.

I form on the outer edge of my blank two lips or flanges, $b\,b$, which lips, in the finished connections B B, are upon two opposite sides and extend in the same general direction as the length of the handle. The flanges being upon two opposite sides only, there is an open space between their ends with a flangless edge. They are also bent backward, so as to stand at an angle to the sides of the connections B B, as shown by the sectional view, Fig. 3. It is best not to bend the flanges or lips back too far, but leave them to be bent back by the workman who attaches the handle to the vessel, so that he can bend them to fit the surface to which they are to be soldered. They can readily be secured to any plain surface on the side of a tea-pot or other vessel, or, if desired, over an upright seam of said vessel. In the latter case the lips or flanges of each connection will rest upon the body of the vessel at the opposite sides of the seam, while the flangeless edge between the ends of said flanges will rest on the seam. In either case the sides of the metal in the lips or flanges will be soldered to the side of the vessel, whereby a much stronger union is effected than where only the edge of the connection faces the side of the vessel.

I claim as my invention—

The herein-described handle for tea-pots and analogous vessels, consisting of the handle-body A, and sheet-metal connections B B, having upon opposite sides at their outer ends the longitudinal lips or flanges $b\,b$, standing at an angle to the sides of said connections, and having also a flangeless edge between the ends of said flanges, substantially as described, and for the purpose specified.

ENOS E. STOW.

Witnesses:
WILLIAM J. BAYRER,
A. M. LEWIS.